Sept. 14, 1965   J. J. ROZMUS   3,206,668
PRECISION TACHOMETER

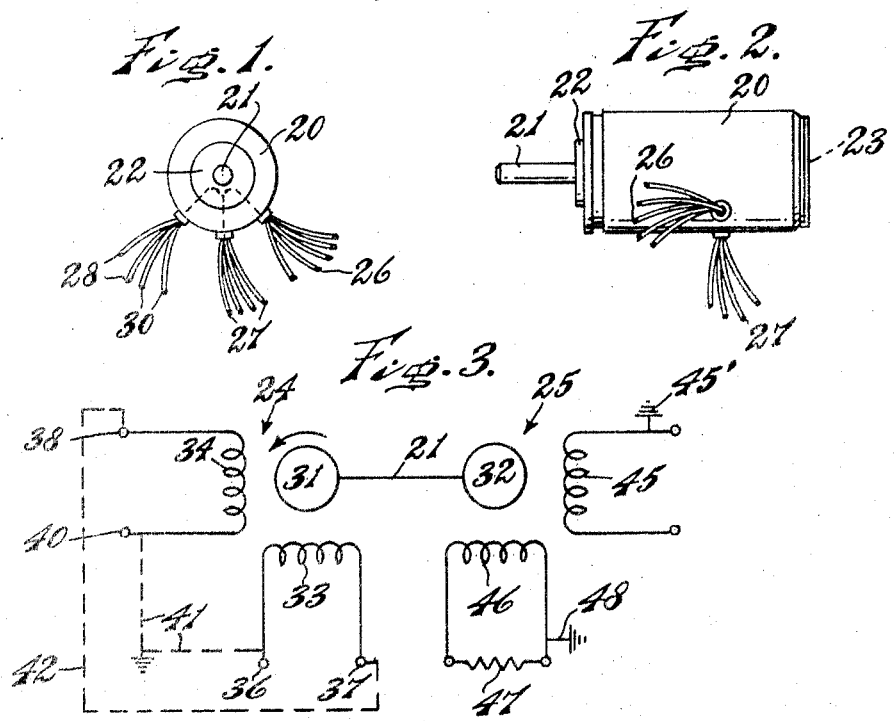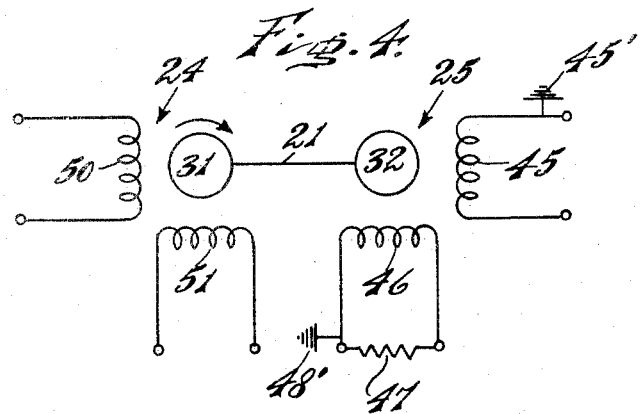

Filed July 31, 1962   2 Sheets-Sheet 2

INVENTOR
John J. Rozmus
BY
ATTORNEYS

United States Patent Office 3,206,668
Patented Sept. 14, 1965

3,206,668
PRECISION TACHOMETER
John J. Rozmus, Berwyn, Pa., assignor to Harowe Servo Controls Inc., West Chester, Pa., a corporation of Pennsylvania
Filed July 31, 1962, Ser. No. 213,749
8 Claims. (Cl. 322—34)

The present invention relates to precision tachometers for use in integration devices and particularly to the temperature compensation of such precision tachometers.

A purpose of the invention is to obtain better temperature control of a precision tachometer for use in an integration device so as to provide a constant transformation ratio characteristic from the tachometer.

A further purpose is to reduce the likelihood of mechanical failure of the heater coil of a precision tachometer.

A further purpose is to reduce the heat transfer lag or hunting of a temperature control in a precision tachometer.

A further purpose is to reduce the dissipation of heat by a precision tachometer which may interfere with the operation of other components.

A further purpose is to increase the stability of a precision tachometer.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is an end elevation from the shaft end of a precision tachometer according to the invention.

FIGURE 2 is a side elevation of the device of FIGURE 1.

FIGURE 3 is an electric circuit diagram of one embodiment of a precision tachometer of the invention, showing only the motor and generator circuits to avoid confusion. This form illustrates a control phase on the motor stator windings.

FIGURE 4 is a view similar to FIGURE 3 but showing wholly separate phases on the motor stator winding.

Figure 5:
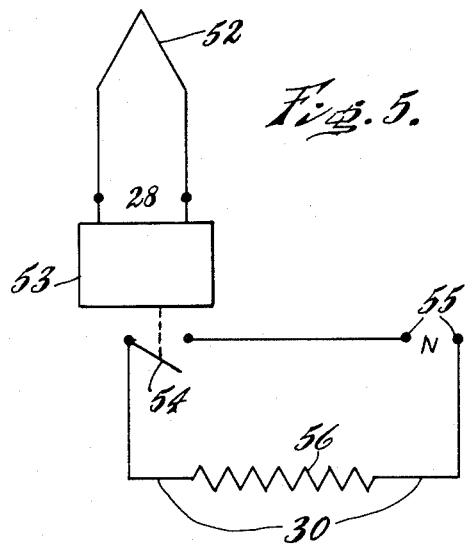
FIGURE 5 is an electric circuit diagram illustrating the heater coil and the control thereof.

Precision tachometers are important components of integration devices as well known in the art.

Efforts have been made in the past to heat precision tachometers to constant temperatures so as to obtain a constant transformation ratio characteristic from the precision tachometer. These prior art precision tachometers provided with heaters have caused difficulty in a number of respects.

The practice in the past has been to surround the stator windings of the precision tachometer with a heater blanket. The heater blankets have tended to be unwieldy. There has been much mechanical differential expansion and contraction, and often the device has failed mechanically because of the forces produced by such expansion and contraction.

From the standpoint of temperature control, the heater blankets have been unsatisfactory because there is a great deal of heat transfer lag. The heat has a much more favorable path to the surrounding area. Therefore the prior art precision tachometers have given off a great deal of heat to surrounding components. This heat dissipation to neighboring equipment has been very hazardous and in some cases has tended to interfere with proper functioning of other components of the device.

The construction of the housing and the stator laminations or core causes large time lag between the sensed commands of the heater and the actual heat transfer. The time-temperature oscillation extends over long periods and this actually interferes with efficient functioning of the precision tachometer.

In the device of the present invention the sensing element and the heater coil are carried right into the interior of the stator windings of the generator. Thus the heat is developed right at the heart of the stator windings. This has several different advantages. In the first place, the heat is provided right at the location of the temperature sensor so that the time lag on heat transfer to the stator windings is negligible. Temperature variations as small as half a degree F. can be obtained with time-temperature cycles as short as 5 seconds.

Thus extremely high stabilities of the precision tachometer can be obtained.

The former mechanical difficulties are largely avoided and failures from mechanical causes are rendered much less frequent.

Heat is not needlessly wasted to surrounding components, and therefore the device does not prove to be a source of objectionable heating of neighboring equipment.

The heater winding should very desirably be non-inductive so that the D.C. current which will normally be used to energize the heater does not excite the iron of the generator stator core and change the output characteristics of the tachometer.

Considering first FIGURES 1 and 2, I there illustrate a precision tachometer having a housing 20 which houses a stator to be described, the stator of course consisting of a stator core or laminations and a stator winding, the stator surrounding a rotor of any well known type which is mounted on shaft 21 and turns in suitable bearings 22 and 23 mounted in the housing.

The electrical mechanism as shown in FIGURE 3 comprises a motor 24 and a generator 25, both of which are suitably constructed of the synchro type so that the overall diameter of the device in normal practice will be less than an inch.

Through the housing are led out motor leads 26, generator leads 27, temperature, heater sensing leads 28, and heater coil leads 30.

As shown in FIGURE 3 the motor rotor 31 and the generator rotor 32 are connected on the same shaft.

The motor in this form has a stator fixed phase winding 33 and a stator control winding 34. The fixed phase winding terminals 36 and 37 are connected to one A.C. phase and the control winding terminals 38 and 40 are connected to another A.C. phase.

The dotted lines show the control phase connection which consists of leads 41 from terminals 36 and 40 connected to ground, and lead 42 from terminal 38 to terminal 37.

The generator stator consists of an input A.C. phase stator winding 45 grounded at one side at 45′, and an output A.C. phase stator winding 46 which is connected across lead 47 and grounded at 48 at one terminal.

Before describing the arrangement of the temperature sensor and the heater coil of the present invention, I will describe the variation in the precision tachometer shown in FIGURE 4, which has a phase one A.C. winding 50 and a phase two A.C. winding 51 for the motor stator and the same general construction of the generator stator windings except that the ground 48′ is placed on the opposite side of the output A.C. phase.

The electrical arrangement of the heater as shown in FIGURE 5 comprises a sensing element 52 connected to the terminals 28. This may be either a thermistor or a thermocouple as desired. This is connected to a thermostatic controller 53 of well known type which when it calls for heat closes electric switch 54 which is in circuit across power leads 55 with non-inductive heater coil 56.

Both the sensing element 52 and the heater coil 56 extend through all of the stator windings shown in FIGURES 3 and 4.

Figure 6:
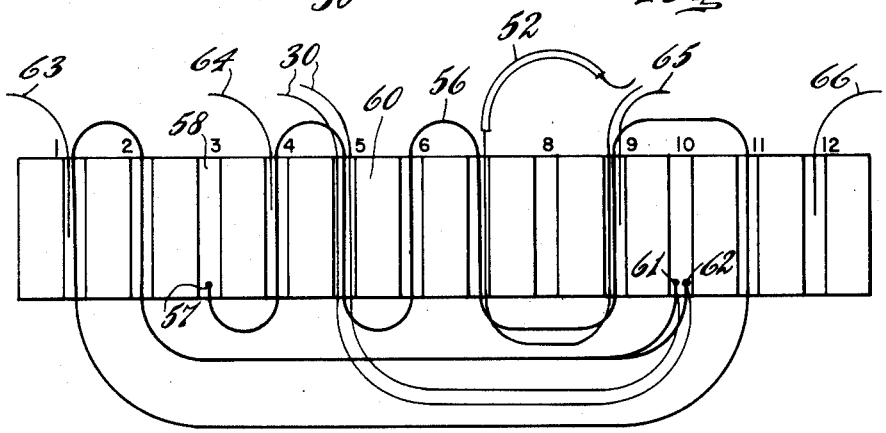
FIGURE 6 is a developed view showing the generator stator winding including the heater sensor and the heater coil.
Figure 7:
FIGURE 7 is a fragmentary enlarged section of a portion of slot member 3 in the plane of the paper of FIGURE 6 showing the end of the bifilar winding.

The construction of the stator windings and their relation to the heater windings is shown diagrammatically in FIGURES 6 and 7. As shown best in FIGURES 6 and 7, the heater coil 56 is wound bifilarly so that there is an end loop 57 inserted in one of the slots 58 of the stator core 60 and the bifilar winding extends through various slots suitably shown as slots 4, 5, 6, 7, 10 and 11, and then returns to slots 1 and 2 and is brought to terminals 61 and 62 in slots 10 where heater leads 30 connect to the ends of the heater coil 56. The main winding following conventional practice has leads 63, 64, 65 and 66 to various slots. It will thus be evident that in slots 7 and 9 the sensor element, the heater coil and the stator winding of the generator (not shown except for the leads) are all present, and therefore very accurate control is obtained.

For the purpose of indicating characteristics of the device, the following examples set forth typical characteristics:

*Example I*

The characteristics of the device of FIGURE 3 in the preferred embodiment are as follows:

| | |
|---|---:|
| Voltage on the motor phase I _____v__ | 26 |
| Voltage on the fixed phase _____v__ | 40 |
| Voltage on the generator input _____v__ | 26 |
| Frequency on all windings _____cycles__ | 400 |
| Current measured at stall on motor phase I ma__ | 120 |
| Current measured at stall on the fixed phase ma__ | 83 |
| Current measured at stall on the generator input ma__ | 75 |
| Power input measured at stall on motor phase I watts__ | 2.3 |
| Power input measured at stall on fixed phase watts__ | 2.6 |
| Power input measured at stall on generator watts__ | 1.7 |
| Power factor measured at stall on the motor phase I | 0.739 |
| Power factor measured at stall on the fixed phase | 0.784 |
| Power factor measured at stall on the generator input | 0.85 |
| Impedance (Z) measured at stall on the stator winding phase I _____ohms__ | 216 |
| Impedance (Z) measured on stall on the fixed phase stator winding _____ohms__ | 482 |
| Impedance (Z) measured on stall on the generator stator input winding _____ohms__ | 400 |
| Resistance (R) measured at stall on the motor phase I _____ohms__ | 159 |
| Resistance (R) measured at stall on the fixed phase stator winding _____ohms__ | 378 |
| Resistance (R) measured at stall on the generator stator input winding _____ohms__ | 330 |
| Inductance (X) measured at stall on the motor stator winding phase I _____ohms__ | 146 |
| Inductance (X) measured at stall on the motor fixed phase winding _____ohms__ | 225 |
| Effective resistance measured at stall on the motor stator winding phase I _____ohms__ | 300 |
| Effective resistance measured at stall on the fixed phase motor winding _____ohms__ | 622 |
| D.C. resistance of the motor on phase I __ohms__ | 57 |
| D.C. resistance of the motor on the fixed phase ohms__ | 168 |
| D.C. resistance on the generator phase I __do___ | 220 |
| D.C. resistance on the generator phase II _do____ | 475 |
| Starting voltage 0.8 volt max. at 25° centigrade. | |
| Residual voltage at zero r.p.m., 24 mv. max. | |
| Phase angle 3 degrees per 30 degrees centigrade change. | |
| Output impedance _____ohms__ | 875 |
| Voltage gradient 32 plus .064 minus .020. | |
| Voltage breakdown 500 volts A.C. 60 cycles to ground. | |
| Minimum no load speed _____r.p.m__ | 9,500 |
| Stall torque minimum _____inch-ounces__ | 0.225 |
| Rotor moment of inertia _____gm.-cm.²__ | 1.0 |
| Theoretical acceleration _____radians/sec.²__ | 15,900 |
| Rise in temperature on no load _____° C__ | 18 |
| Rise in temperature on stall with 40 volts on motor fixed phase _____° C__ | 40 |
| Rise in temperature on stall with 20 volts on fixed phase _____° C__ | 27 |
| Temperature range 55° to 150° centigrade. | |
| Maximum unit operating temperature ____° C__ | 190 |

*Example II*

Typical data for the device of FIGURE 4 is as follows:

| | |
|---|---:|
| Voltage on the motor stator winding phase I volts__ | 26 |
| Voltage on the motor stator phase II _____do____ | 26 |
| Generator input _____do____ | 26 |
| Frequency of motor phase I and phase II and generator input phase _____cycles__ | 400 |
| Current at stall in stator phase I of motor ___ma__ | 130 |
| Current at stall in phase II of motor _____do____ | 130 |
| Current at stall in generator input phase ____do____ | 156 |
| Power input at stall on motor stator phase I watts__ | 3.6 |
| Power at stall on motor stator phase II ____do____ | 3.6 |
| Power at stall on generator input _____do____ | 3.7 |
| Power factor at stall on motor stator phase I _____ | 0.65 |
| Power factor at stall on motor phase II _____ | 0.65 |
| Power factor at stall on generator input phase ____ | 0.8 |
| Impedance (Z) at stall on motor stator winding phase I _____ohms__ | 200 |
| Impedance (Z) at stall on motor stator winding phase II _____ohms__ | 200 |
| Impedance (Z) at stall on generator input phase I _____ohms__ | 167 |
| Resistance (R) at stall on motor stator winding phase I _____ohms__ | 130 |
| Resistance (R) at stall on motor stator winding phase II _____ohms__ | 130 |
| Resistance (R) at stall on generator input phase ohms__ | 133 |
| Inductance (X) at stall on motor stator winding phase I _____ohms__ | 153 |
| Inductance (X) at stall on motor stator winding phase II _____ohms__ | 153 |
| Inductance (X) at stall on generator stator input phase winding _____ohms__ | 100 |

In phase, fundamental null is (for any rotor position): 0.007 volt maximum.

The phase angle is 7° between phase I and II at 3600 r.p.m.

The voltage gradient is 0.34 plus 0.085 minus 0.035 per thousand r.p.m.

The no load speed is 19,400 r.p.m.

The stall torque is 0.26 inch ounces.

The rotor moment of inertia is 2.25 gm.-cm.².

The maximum temperature rise on the motor under no load is 27 degrees and at stall is 84 degrees.

The operating temperature is 55° centigrade to 150° centigrade.

The maximum unit operating temperature is 234° C.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a precision tachometer a motor comprising a stator and a rotor and having a shaft, a generator comprising a stator and a rotor coaxial with the motor, and having a common shaft connecting the motor and the generator, each of said stators comprising laminations and a stator winding, a temperature sensing element disposed within the interior of said generator stator winding, a control device connected to the temperature sensing element, and a heater coil extending through the interior of said generator stator winding and controlled by said control device.

2. A precision tachometer of claim 1, in which said temperature sensing element comprises a thermistor.

3. A precision tachometer of claim 1, in which said heater coil is non-inductive.

4. A precision tachometer of claim 1, in which the stator winding of the generator, the sensing element and the heater coil are all wound together in a portion of the generator stator.

5. The combination with a precision tachometer which at a selected temperature of its windings and their supporting structure has a known transformation ratio characteristic, said windings being disposed in winding slots, of means for maintaining said windings at said selected temperature comprising elongated heating means disposed within said winding slots for conductive transfer of heat directly to said windings and to their supporting structure, temperature sensing means disposed within said winding slots for direct measurement of the temperature of said windings, and means responsive to said temperature sensing means for controlling the energization of said heating means to maintain the temperature of said windings at said selected temperature.

6. The combination of claim 5 in which said heating means is a non-inductive bifilar heating coil extending with said windings through a plurality of said winding slots.

7. The combination with a precision tachometer which at a selected temperature of its windings and their supporting structure has a known transformation ratio characteristic, said windings being disposed in winding slots, of means for maintaining said windings at said selected temperature comprising elongated heating means disposed within said winding slots for conductive transfer of heat directly to said windings and to their supporting structure, and means operable upon change of temperature of said windings for controlling the energization of said heating means to maintain the temperature of said windings at said selected temperature.

8. The combination of claim 7 in which said heating means is a non-inductive bifilar heating coil extending with said windings through a plurality of said winding slots.

References Cited by the Examiner

UNITED STATES PATENTS 2,926,297    2/60    Humber et al. _____ 322—33

LLOYD McCOLLUM, *Primary Examiner.*